United States Patent [19]
Bromberg et al.

[11] Patent Number: 5,819,066
[45] Date of Patent: Oct. 6, 1998

[54] APPLICATION AND METHOD FOR BENCHMARKING A DATABASE SERVER

[75] Inventors: Richard N. Bromberg, Westminster, Colo.; Richard W. Kupcunas, Lewisville, Tex.

[73] Assignee: Electronic Data Systems Corporation, Plano, Tex.

[21] Appl. No.: 608,070

[22] Filed: Feb. 28, 1996

[51] Int. Cl.[6] .............................. G06F 9/455; G06F 11/30
[52] U.S. Cl. .................... 395/500; 395/920; 395/184.01; 395/183.09; 395/704; 395/602; 395/613; 395/670; 395/672
[58] Field of Search ..................................... 395/500, 613, 395/183.09, 184.01, 920, 704, 602, 670, 672

[56] References Cited

PUBLICATIONS

"AVATECH Announces the Availability of Synthetic Benchmark Toolkit," AVATECH, Sep. 30, 1989.

"Product Name: Stress Magic (463531)," NetMagic Systems Inc., Sep. 1993.

Graziano, "A NetWare Virtual Benchmark," Lantimes, Feb. 27, 1995.

*Primary Examiner*—Alyssa H. Bowler
*Assistant Examiner*—John Follansbee
*Attorney, Agent, or Firm*—Christopher W. Kennerly; L. Joy Griebenow

[57] ABSTRACT

A benchmarking application for testing the performance of a database server (14) includes a plurality of execution parameters (82) and a program (78) operable to read the execution parameters (82). Processes (56, 58, 60) are generated by the program (78) in accordance with the execution parameters (82). Each process (56, 58, 60) represents a user (16, 18, 20) of the database server (14) and generates benchmark transactions (108) for submission to the database server (14).

26 Claims, 5 Drawing Sheets

APPLICATION AND METHOD FOR BENCHMARKING A DATABASE SERVER

TECHNICAL FIELD OF THE INVENTION

This invention relates in general to the field of database administration, and more particularly to a benchmarking application and method for measuring the performance of a database server.

BACKGROUND OF THE INVENTION

Many database administrators are responsible for monitoring the performance of database environments that include a collection of interconnected devices, such as a database, a database server, and a plurality of users. It is often desirable to measure the performance of such systems by conducting one or more benchmark tests. For example, a series of benchmark tests might be conducted in order to measure the performance of the database server under different conditions.

As database environments become larger and more complex to serve a variety of users and information requests, database administrators may desire to measure the performance of certain aspects of the database environment using various benchmarking techniques. A known technique for benchmarking client-server configurations within online transaction processing (OLTP) environments uses remote terminal emulator (RTE) products to simulate the client environment. Often this technique measures performance on the client and network components as well as the database server. RTE benchmarking tools typically require complex and expensive software to record all activity on the client application, including key and mouse movements. Furthermore, tremendous effort may be required to configure the network, record client scripts, and coordinate the playback of the scripts in order to execute a benchmark test.

In addition, developing and modifying benchmark tests for RTE benchmarking tools is often difficult and costly, because the client processes used to generate benchmark queries often must be recorded and tested each time benchmark queries are added or modified. Furthermore, changing the database configuration or scaling the number of client processes can require extensive rework of RTE scripts. These and other limitations make many RTE benchmarking tools less suitable for use in connection with large relational databases often associated with data warehouses, which typically use decision support tools that generate long-running queries and non-repetitive transaction profiles.

SUMMARY OF THE INVENTION

In accordance with the present invention, the disadvantages and problems associated with benchmarking applications and methods have been substantially reduced or eliminated.

In accordance with one embodiment of the present invention, a benchmarking application for measuring the performance of a database server includes execution parameters and a program that reads the execution parameters. Processes are generated by the program in accordance with the execution parameters, each process representing a user of the database server. Each process is operable to generate benchmark transactions for submission to the database server. In a more particular embodiment, the benchmark transactions for each user are generated in a reproducible transaction sequence. Each process is operable to generate the benchmark transactions in the reproducible transaction sequence each time the process is generated.

Important technical advantages of the present invention include providing a benchmarking application and method that generates a reproducible and scalable transaction profile for measuring the performance of a database server. The benchmarking may be performed under changing database configurations or scale-up at the system and user levels. In contrast to many RTE benchmarking tools, the present invention focuses on the performance and scalability of the database server rather than performance of the network, user interfaces, and workstations.

Another important technical advantage includes providing a benchmarking application and method that may be customized using a simple programmatic interface, thereby providing a flexible mechanism for simulating complex and varied transaction profiles. Further technical advantages include providing a benchmarking application and method that generates a detailed log of transaction activity for reporting and analysis, imposes little or no influence on the database environment being measured, and is portable across hardware platforms and between database management system (DBMS) vendors. Other technical advantages are readily apparent to one skilled in the art from the following figures, descriptions, and claims.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF THE INVENTION

Figure 1:
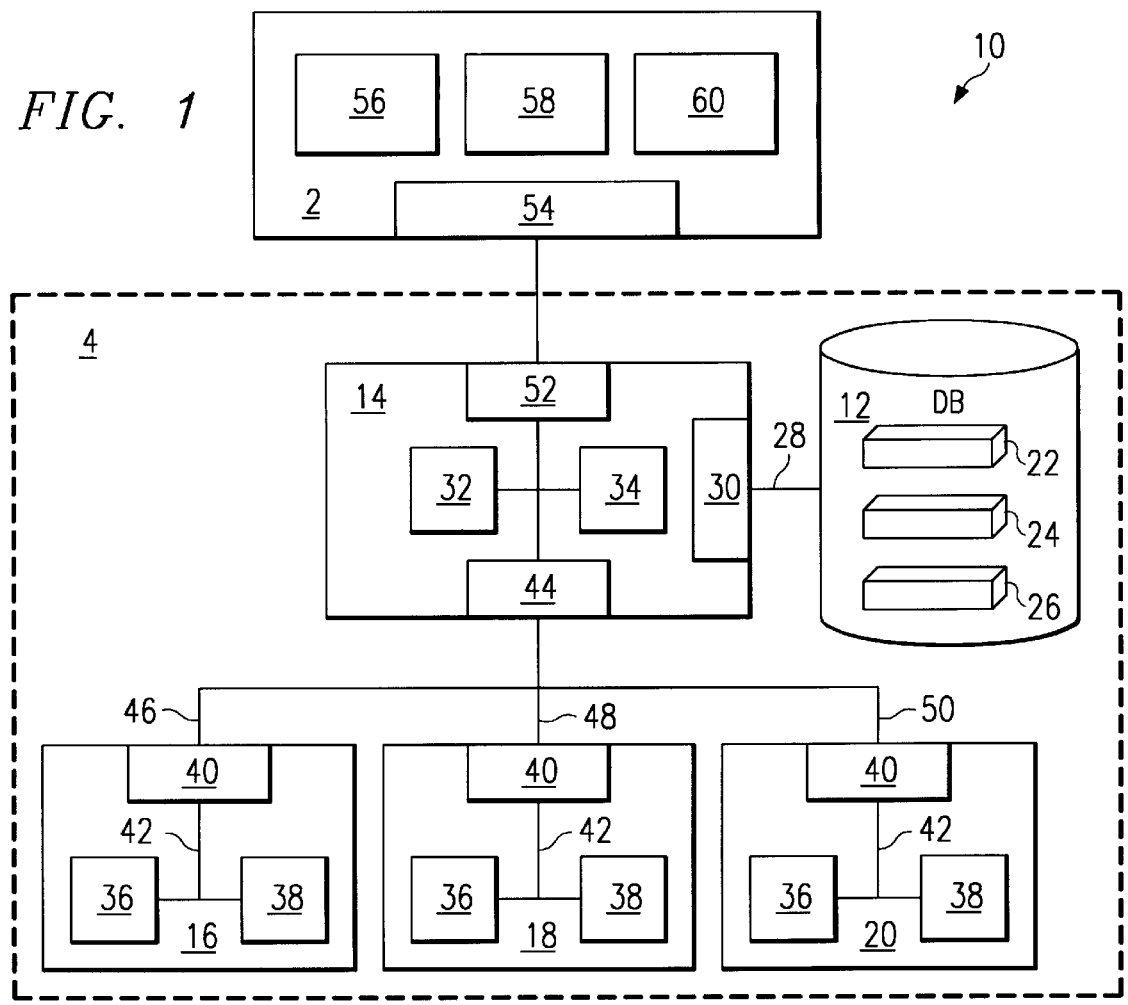
FIG. 1 illustrates a benchmarking application coupled to a database environment.

FIG. 1 illustrates a system 10 that includes a benchmarking application 2, a database 12, and a database server 14 having a plurality of users 16, 18, and 20. Database 12 may be any aggregation of data, together with a collection of operations that facilitate searching, sorting, recombination, and similar activities.

In one particular embodiment, database 12 is a relational database that stores information in tables containing rows and columns of data. The rows of a table represent records, which are collections of information about separate items, and the columns represent fields, which are particular attributes of the records. In conducting searches, database 12 matches information from a field in a first table with information in the corresponding field of a second table to produce a third table that combines requested data from the first and second tables. In general, database 12 uses matching values in two tables to relate information in one table to information in the other table. The present invention contemplates database 12 storing and retrieving data in any suitable manner.

A plurality of user accounts 22, 24, and 26 are associated with database 12. User accounts 22, 24, and 26 specify the access users 16, 18, and 20, respectively, have to database 12 and its resources. In one embodiment, user accounts 22, 24, and 26 contain information concerning users 16, 18, and 20, respectively, such as a user ID, a user password, and the rights and permissions the user has for using database 12 and accessing its resources. As discussed below, user accounts 22, 24, and 26 provide information used by benchmarking application 2 in conducting one or more benchmark tests.

Database server 14 is coupled to database 12 and user accounts 22, 24, and 26 using interface 30 and link 28. In general, database server 14 supports a database management system (DBMS) that permits centralized control of security and data integrity requirements for database 12. In general, the DBMS is a layer of software between database 12 and users 16, 18, and 20 that manages access by users 16, 18, and 20 to the resources of database 12. Where database 12 is a relational database, the DBMS supported by database server 14 may be a relational DBMS (RDBMS). Database server 14 may be a mainframe computer, miniframe computer, personal computer, or any other processing device having access to the resources of database 12. Database server 14 may be coupled to any suitable wireline or wireless link in order to communicate data with database 12. In one embodiment, database server 14 comprises a mainframe computer operable to communicate data using the IBM 3770 data communications protocol.

Database server 14 comprises a memory 32 and a processor 34 that together operate to store, process, or manipulate data. Memory 32 may be any suitable memory, such as dynamic or static random access memory (RAM), read only memory (ROM), magnetic media, optical media, CD-ROM, or other suitable volatile or non-volatile storage media. Memory 32 stores information in files, directories, tables, or any other suitable arrangement. Memory 32 contains instructions for processor 34 to execute in managing the operation of database server 14 and the DBMS supported by database server 14.

In general, users 16, 18, and 20 may be any logical entities in hardware and/or software that desire access to the resources of database 12. Users 16, 18, and 20 each include a memory 36 and a processor 38 that together operate to store, process, or manipulate data. Memory 36 and processor 38 of users 16, 18, and 20 are coupled to an interface 40 using link 42. Interfaces 40 for users 16, 18, and 20 are coupled to interface 44 of database server 14 using links 46, 48 and 50, respectively.

Generally, users 16, 18, and 20 may be any processing device coupled to any suitable wireline or wireless link 46, 48, and 50, respectively, to communicate data with other processing devices such as database server 14. For example, users 16, 18, and 20 may be miniframes or personal computers and links 46, 48, and 50, respectively, may communicate data using any suitable communications protocol. Together, database 12, database server 14, and users 16, 18, and 20 make up the database environment 4 associated with benchmarking application 2.

During normal processing, users 16, 18, and 20 generate queries or other information requests for submission to database server 14. Users 16, 18, and 20 submit these queries or information requests to database server 14 using interfaces 40, links 46, 48, and 50, respectively, and interface 44. Database server 14 and the associated DBMS complete the queries or information requests in cooperation with database 12 and communicate the results to users 16, 18, and 20. In general, benchmarking application 2 generates a number of processes to represent users 16, 18, and 20 in order to measure the performance of database server 14 under different conditions.

Benchmarking application 2 is coupled to interface 52 of database server 14 using interface 54. Interface 54 is coupled to and interacts with processes 56, 58, and 60 of benchmarking application 2. Although benchmarking application 2 is shown as being separate from the database environment, benchmarking application 2 may be integral to or separate from the database environment. Benchmarking application 2 may operate on database server 14, on one or more computers associated with database server 14, or remotely from database server 14. In one embodiment, the influence imposed upon the database environment due to operation of benchmarking application 2 is reduced or eliminated when benchmarking application 2 operates remotely from the database server 14.

In operation, processes 56, 58, and 60 represent users 16, 18, and 20, respectively, and allow benchmarking application 2 to focus on measuring the performance and scalability of database server 14. During benchmark tests, processes 56, 58, and 60 combine to generate reproducible and scalable benchmark transaction profiles for submission to database server 14. In one embodiment, the transaction profiles generated by processes 56, 58, and 60 are customized so as to provide a representation of transaction loads that may be imposed on database server 14 by users 16, 18, and 20 under different conditions. The operation of benchmarking application 2 and processes 56, 58, and 60 is discussed more fully below in connection with FIGS. 2 through 7.

Benchmarking application 2 and the benchmark tests conducted using benchmarking application 2 may be focused to measure the performance and scalability of database server 14, without considering the performance of the network, user interface, user processing, and other components of the database environment. Therefore, benchmarking application 2 need not emulate all interaction of users 16, 18, and 20 with the database environment, providing an important technical advantage. Furthermore, processes 56, 58, and 60 allow benchmarking application 2 to measure the performance and scalability of database server 14 while imposing little or no influence on the database environment. In one embodiment, benchmarking application 2 is portable across hardware platforms and between DBMS vendors.

Figure 2:
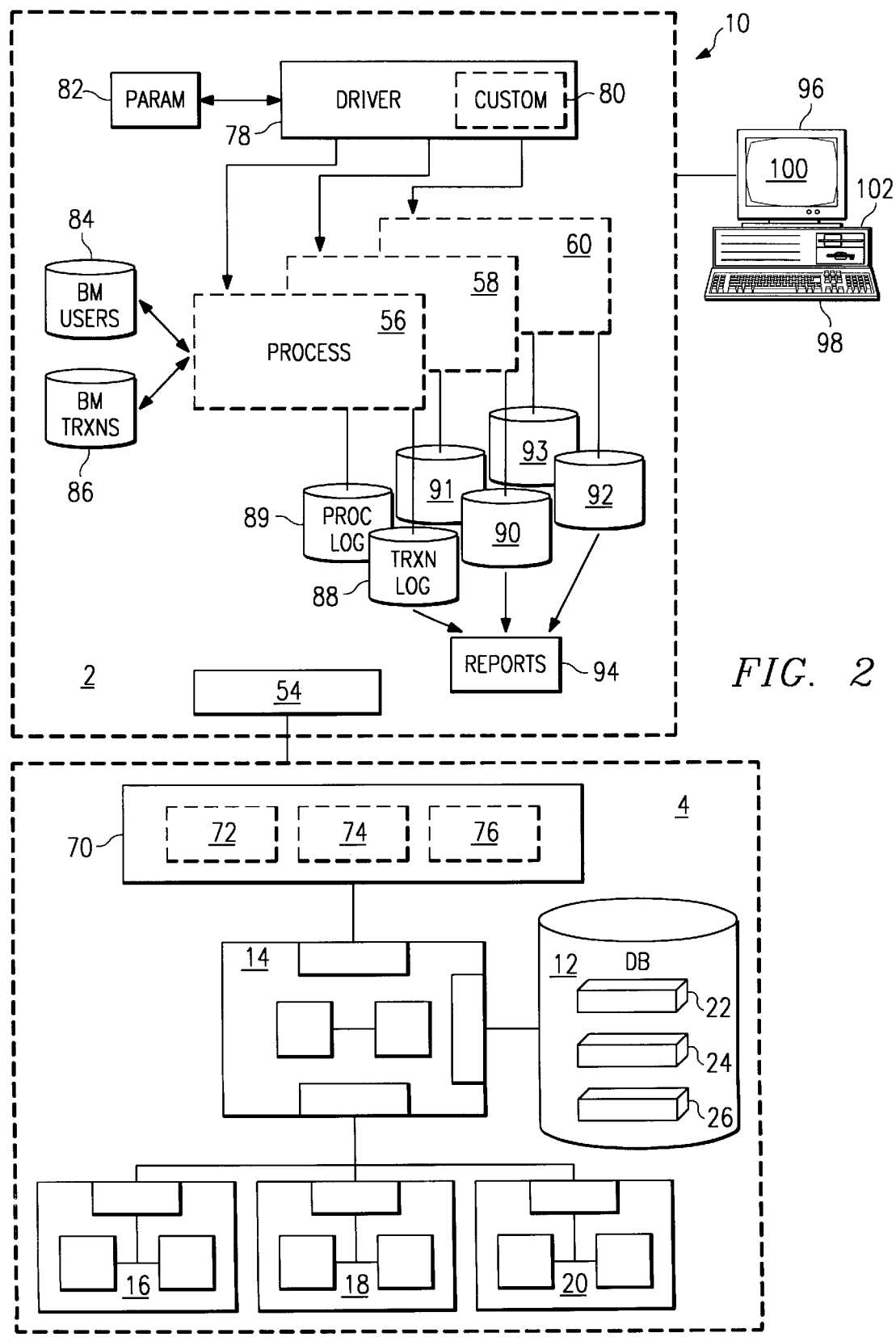
FIG. 2 illustrates a particular embodiment of a benchmarking application coupled to a database environment.

As discussed above, it may be desirable to operate benchmarking application 2 remotely from database server 14 in order to reduce or eliminate the influence benchmarking application 2 imposes on the database environment. FIG. 2 illustrates benchmarking application 2 remote from database environment 4. Database environment 4 includes database 12, database server 14, and users 16, 18, and 20, as described above with reference to FIG. 1.

Benchmarking application 2 may operate on one or more computers 96. Computer 96 may include an input device 98, such as a keypad, touch screen, or other device that can accept information. An output device 100 may convey information associated with the operation of benchmarking application 2, including digital or analog data, visual information, or audio information. Both input device 98 and output device 100 may include fixed or removable storage media, such as magnetic computer disks, CD-ROM, or other suitable media to both receive output from and provide input to benchmarking application 2. Computer 96 may have a processor 102 and an associated volatile or non-volatile memory execute instructions and manipulate information in accordance with the operation of benchmarking application 2.

Benchmarking application 2 establishes and conducts communications sessions with database environment 4 using interface 54. Interface 54 is coupled to interface 70 of database environment 4 using any suitable wireline or wireless link. In one embodiment, shadow processes 72, 74, and 76 operate generally on interface 70 and are the only appreciable influence imposed on database environment 4 due to the operation of benchmarking application 2. In general, shadow processes 72, 74, and 76 reproduce the connect mechanism associated with certain client-server environments.

Benchmarking application 2 includes a driver program 78 that may be customized to suit the requirements of a particular database environment 4 or benchmark test. Customizing components 80 provide this capability and are discussed more fully below in connection with FIGS. 3 and 5. Customizing components 80 may operate in association with one or more components of benchmarking application 2 that are external to driver program 78. Driver program 78 is coupled to and reads execution parameters 82. Execution parameters may include, without limitation: the number of users and associated user accounts for the benchmark test (NUM); the duration of the benchmark test; a pause factor used in calculating the pause intervals between benchmark transaction generation; the name given to the benchmark test; and any other parameters suitable to customize benchmarking application 2 for a particular benchmark test.

Driver program 78 generates processes 56, 58, and 60 in accordance with execution parameters 82. In one embodiment, each process 56, 58, and 60 is a distinct instantiation of driver program 78. Driver program 78 generates separate processes 56, 58, and 60 to represent each user 16, 18, and 20, respectively, specified in execution parameters 82 by the NUM parameter. Processes 56, 58, and 60 may be generated in accordance with execution parameters 82 in any suitable manner. For example, driver program 78 may read execution parameters 82 to determine the number of processes 56, 58, and 60 that driver program 78 must generate to represent users 16, 18, and 20 in accordance with the NUM parameter. In one embodiment, driver program 78 passes execution parameters 82 to each generated process 56, 58, and 60 as run-time arguments for use in generating benchmark transactions for submission to database server 14.

In one embodiment, driver program 78 compares the number of processes already generated to the NUM parameter specified in execution parameters 82. If the NUM parameter is greater than the number of processes already generated, driver program 78 generates, with or without a delay interval, an additional process to represent an additional user. Driver program 78 then loops, with or without a delay interval, and again compares the number of processes already generated to the NUM parameter. If necessary, driver program 78 again generates, with or without a delay interval, an additional process to represent an additional user. Driver program 78 loops in this manner until the number of generated processes 56, 58, and 60 is in accordance with the NUM parameter specified in execution parameters 82. For the three user benchmark test illustrated in FIG. 2, driver program 78 will loop three times, generating three processes 56, 58, and 60 to represent users 16, 18, and 20, respectively. The present invention contemplates other suitable mechanisms for generating separate processes 56, 58, and 60 for each user 16, 18, and 20.

Processes 56, 58, and 60 are coupled to and access a benchmark users file 84. In one embodiment, benchmark users file 84 is run-time file identifying each user 16, 18, and 20 for the benchmark test by an associated user ID. For example, the user ID for user 16 might be "0001," the user ID for user 18 might be "0002," and the user ID for user 20 might be "0003." Benchmark users file 84 also identifies the user accounts 22, 24, and 26 associated with users 16, 18, and 20. In one embodiment, as discussed below in connection with FIGS. 3 and 6, processes 56, 58, and 60 open benchmark users file 84 in order to determine which user accounts 22, 24, and 26, respectively, to use to access the resources of database 12 for a particular benchmark test.

Benchmark users file 84 also contains a user ID sequence, which is a record of the number of users 16, 18, and 20 currently represented by generated processes for the benchmark test, arranged in sequence according to user ID. The user ID sequence is updated each time a new process is generated, with the delimiter for incrementing the user ID sequence being the NUM parameter specified in execution parameters 82. For example, with a NUM parameter of three, driver program 78 will generate only three processes. As processes 56, 58, and 60 are generated to represent users 16, 18, and 20, respectively, the user ID sequence might be updated from "0001" to "0002" to "0003" in succession.

Processes 56, 58, and 60 are also coupled to and access a benchmark transactions file 86. In one embodiment, benchmark transactions file 86 is a run-time file containing a list of each benchmark transaction that processes 56, 58, and 60 will generate for submission to database server 14. Benchmark transactions file 86 also contains an execution sequence specifying the order in which the benchmark transactions will be generated. As discussed more fully below in connection with FIGS. 3 and 6, driver program 78 may vary the pattern and temporal relationship in which benchmark transactions are generated for each user 16, 18, and 20 using the execution sequence. For example, for a three user benchmark test involving ten benchmark transactions, each user 16, 18, and 20 will generate the ten benchmark transactions in a different pattern and will generate the ten benchmark transactions over a different timespan.

Benchmark processes 56, 58, and 60 are coupled to transaction log files 88, 90, and 92, respectively. Therefore, each transaction log file 88, 90, or 92 is associated with a particular user 16, 18, or 20, respectively. In one embodiment, each transaction log file 88, 90, and 92 contains log records for every benchmark transaction submitted by processes 56, 58, and 60, respectively, for users 16, 18, and 20, respectively. Each log record may include the following fields, without limitation: the user ID; the name given to the benchmark test; the number of users for the benchmark test; the number of the benchmark transaction submitted; the number of times the benchmark transaction was submitted for the user; the start time for the benchmark test; the end time for the benchmark test; the relational DBMS return code for the benchmark transaction returned by a benchmark module associated with the benchmark transaction; the number of rows returned by the benchmark transaction; the elapsed time for completing the benchmark transaction; and any other field suitable for recording in transaction log files 88, 90, and 92.

Benchmark processes 56, 58, and 60 are also coupled to process log files 89, 91, and 93, respectively, each associated with a particular user 16, 18, or 20, respectively. In one embodiment, process log files 89, 91, and 93 contain error and run-time information messages communicated from benchmark processes 56, 58, and 60, respectively, during the operation of benchmarking application 2. For example, a non-zero RDBMS return code for a submitted benchmark transaction may generate an information error message for communication to the process log file 89, 91, or 93 associated with that benchmark transaction, while the return code itself may be recorded in the associated transaction log file 88, 90, or 92.

Collectively, the log records contained in transaction log files 88, 90, and 92 and the messages contained in process log files 89, 91, and 93 may be referred to as log information. In one embodiment, benchmarking application 2 includes a report generation capability 94 that allows benchmarking application 2 to generate analysis reports using some or all of the log information. Report generation capability 94 is discussed more fully below in connection with FIG. 7.

Figure 3:
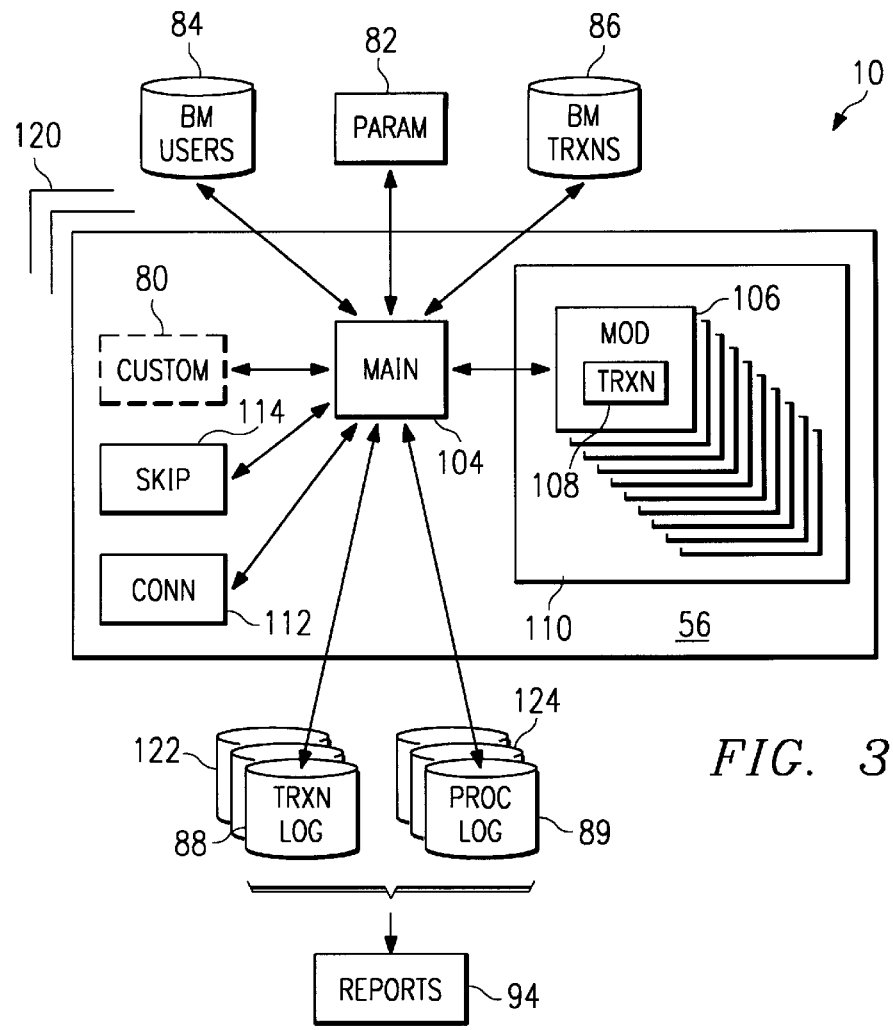
FIG. 3 illustrates a process in the benchmarking application.

FIG. 3 illustrates a generated process 56, which represents generally any of the generated processes 56, 58, or 60. As indicated by the dashed lines 120, 122, and 124 near process 56, transaction log file 88, and process log file 89, respectively, the following discussion concerning process 56 applies equally to processes 58 and 60. Process 56 is coupled to and accesses execution parameters 82, benchmark users file 84, and benchmark transactions file 86. Process 56 includes a main program 104 that directs the tasks of generating benchmark transactions for submission to database server 14, submitting the benchmark transactions to database server 14, and recording log information for the submitted benchmark transactions using transaction log file 88 and process log file 89.

Main program 104 is coupled to one or more benchmark modules 106. In one embodiment, benchmark modules 106 are linked external functions, each containing a particular benchmark transaction 108 in the form of an embedded Structured Query Language (SQL) statement. The embedded SQL statements provide instructions to the DBMS regarding the extraction of data from database 12 and the subsequent handling of the extracted data. In general, each benchmark transaction 108 represents a query or instruction to database server 14 to perform a discrete activity, for example, entering a customer order, updating an inventory item, or a more complex activity such as searching a data warehouse for selected data. Collectively, as indicated by the box, the SQL statements embedded in benchmark modules 106 define a benchmark transaction profile 110 for the particular benchmark test. In one embodiment, as discussed more fully below in connection with FIG. 6, main program 104 calls benchmark modules 106 in order to generate benchmark transactions 108 for submission to database server 14.

As discussed above in connection with FIG. 2, benchmarking application 2 may be customized to suit the requirements of database environment 4 or a particular benchmark test using one or more customizing components 80. Customizing components 80 may operate in association with one or more components of benchmarking application 2 external to process 56 to provide a programmatic interface for customizing benchmarking application 2. Customizing components 80 may be used to modify benchmark transaction profile 110. In one embodiment, benchmarking application 2 is customized using customizing components 80 of driver program 78 before processes 56, 58, and 60 are generated. As generated instantiations of driver program 78, processes 56, 58, and 60 may include some or all of the customizing components 80 originally included in driver program 78.

In one embodiment, customizing components 80 include template functions for creating additional benchmark modules 106 and template functions for embedding customized SQL statements into existing or newly created benchmark modules 106. Within each benchmark module 106, benchmark transactions 108 may be defined as ad-hoc SQL statements, cursor processed SQL statements, or any other type of SQL statement suitable for instructing database server 14 regarding the extraction and handling of data from database 12. Customizing components 80 may also include a plurality of sample functions that may be used as benchmark modules 106 without modification. Each sample function contains an embedded SQL statement representing, for example, a query or other transaction that database server 14 may typically encounter during normal processing. The present invention contemplates other customizing components 80 suitable to customize benchmark transaction profile 110. For example, customizing components 80 may provide, whether alone or in association with other components of benchmarking application 2, a mechanism for compiling process 56 after a customized benchmark transaction profile 110 has been defined.

Connect module 112 is coupled to main program 104 and performs the connect processing that allows process 56 to communicate with database server 14. In one embodiment, connect module 112 includes one or more linked external functions that connect process 56 to database server 14 each time process 56 generates a benchmark transaction 108 for submission to database server 14. Connect module 112 also includes one or more linked external functions that disconnect process 56 from database server 14 after each benchmark transaction 108 has been completed. In one embodiment, connect module 112 can be modified, or a suite of connect modules 112 provide connect processing to different platforms. The present invention contemplates any suitable mechanism for connecting process 56 to database server 14 so that process 56 may communicate with database server 14 during the operation of benchmarking application 2.

As discussed above in connection with FIG. 2, the execution sequence contained in benchmark transactions file 86 may specify the relative order in which process 56 generates benchmark transactions 108 for submission to database server 14. The execution sequence specified in benchmark transactions file 86 may be randomized, inverted, or arranged in any suitable manner. In one embodiment, benchmark transactions 108 are generated in the same relative order for each process 56, 58, and 60, but each process 56, 58, and 60 begins generating benchmark transactions 108 at a different point in the execution sequence. Therefore, the benchmark transaction submission pattern is different for each process 56, 58, and 60. In addition, each process 56, 58, and 60 pauses for a specified period, the specified period differing for each process 56, 58, and 60, after each benchmark transaction 108 is generated. As a result, although the aggregate benchmark transaction profile for users 16, 18, and 20 is reproducible from benchmark test to benchmark test, database server 14 can experience an essentially random transaction load for each benchmark test.

The benchmark transaction submission pattern may vary for each process 56, 58, and 60 using skip algorithm 114. Skip algorithm 114 increments the point in the execution sequence at which a particular process 56, 58, or 60 begins generating benchmark transactions 108 by one benchmark transaction for each user in the user ID sequence contained in benchmark users file 84. For example, for a three-user test, process 56 will begin by generating the first benchmark transaction 108 in the execution sequence, process 58 will begin by generating the second benchmark transaction 108 in the execution sequence, and process 60 will begin by generating the third benchmark transaction 108 in the execution sequence. The present invention contemplates other suitable methods for generating a reproducible aggregate benchmark transaction profile for all users 16, 18, and 20 and for imposing an essentially random transaction load upon database server 14.

In operation, as discussed more fully below in connection with FIG. 6, each process 56, 58, and 60 generated by driver program 78 operates unattended until the benchmark test duration specified in execution parameters 82 has elapsed. Processes 56, 58, and 60 communicate log records and messages to transaction log file 88, 90, and 92 and process log files 89, 91, and 93, respectively, as benchmark transactions 108 are generated, submitted, and completed. Progress of a benchmark test can be observed by browsing transaction log files 89, 91, and 93 associated with users 16, 18, and 20, respectively.

Figure 4:
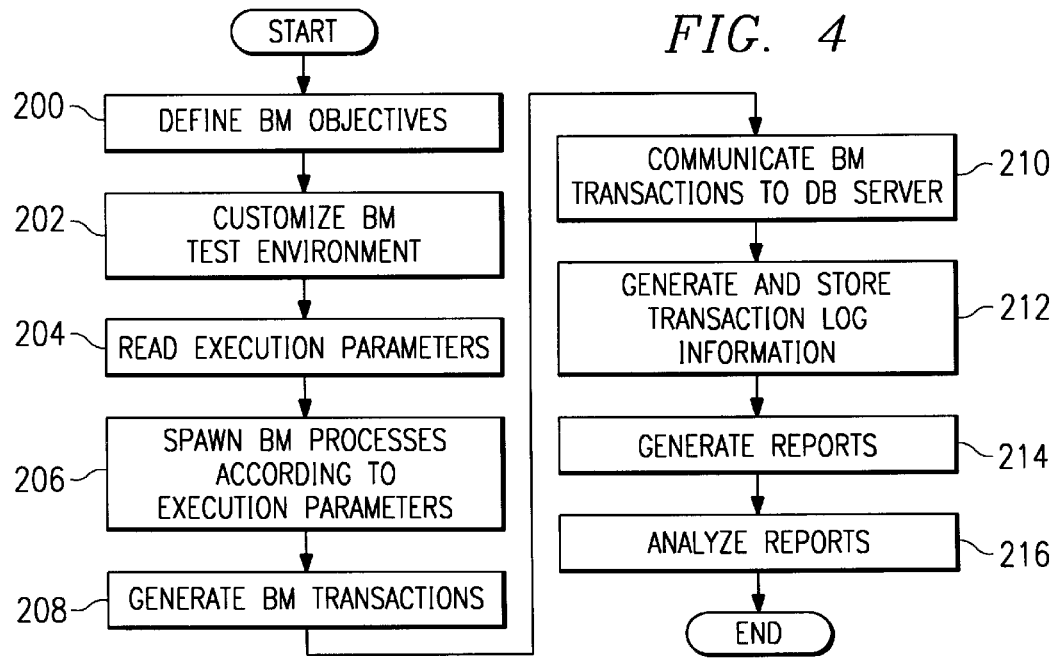
FIG. 4 is a flow chart of a method for measuring the performance of a database server.

FIG. 4 is a flow chart of a method for measuring the performance of database server 14 using benchmarking application 2. The method begins at step 200 where the objectives of the benchmark test are defined. These objectives may vary according to particular requirements of database server 14, database 12, users 16, 18, and 20, and other components of database environment 4.

The benchmark test environment is customized at step 202, according to the benchmark test objectives defined at step 200. Customizing the benchmark test environment may include, for example, configuring database 12, customizing benchmarking application 2 using execution parameters 82 and customizing components 80, compiling benchmarking application 2, and modifying any other suitable aspect of the benchmark test environment. Customizing the benchmark test environment is discussed more fully below in connection with FIG. 5.

Driver program 78 reads execution parameters 82 at step 204. As discussed above in connection with FIGS. 2 and 3, execution parameters 82 may include, without limitation: the number of users and associated user accounts for the benchmark test (NUM); the duration of the benchmark test; a pause factor used in calculating the pause interval between benchmark transaction generation; the name given to the benchmark test; and any other parameter suitable for customizing benchmarking application for a particular benchmark test. At step 206, driver program 78 generates or spawns processes 56, 58, and 60 in accordance with the NUM parameter, each process 56, 58, and 60 representing a particular user 16, 18, or 20, respectively. Driver program 78 may pass execution parameters 82 to each generated process 56, 58, and 60 as run-time arguments for use in generating benchmark transactions 108 for submission to database server 14.

At step 208, processes 56, 58, and 60 generate benchmark transactions 108 specified in benchmark transactions file 86 and defined in the form of SQL statements embedded within a particular benchmark module 106. The benchmark transaction generation pattern for each process 56, 58, and 60 is determined using the execution sequence specified in benchmark transactions file 86 and skip algorithm 114. Once generated at step 208, benchmark transactions 108 are submitted to database server 14 at step 210. At step 212, log information is generated, recorded, and stored in transaction log files 88, 90, and 92 and process log files 89, 91, and 93. Processes 56, 58, and 60 loop back and repeat steps 208 through 212 as many times as are necessary to generate benchmark transactions profile 110. The operation of processes 56, 58, and 60 in generating and submitting benchmark transaction 108 is discussed more fully below in connection with FIG. 6.

Reports are generated using report generation capability 94 at step 214. As discussed above in connection with FIGS. 2 and 3, transaction log files 88, 90, and 92 and process log files 89, 91, and 93 collectively store log information. Report generation capability 94 uses the log information to generate analysis reports for the benchmark test. The analysis reports are analyzed at step 216. The generation and analysis of reports using benchmarking application 2 is discussed more fully below in connection with FIG. 7.

Figure 5:
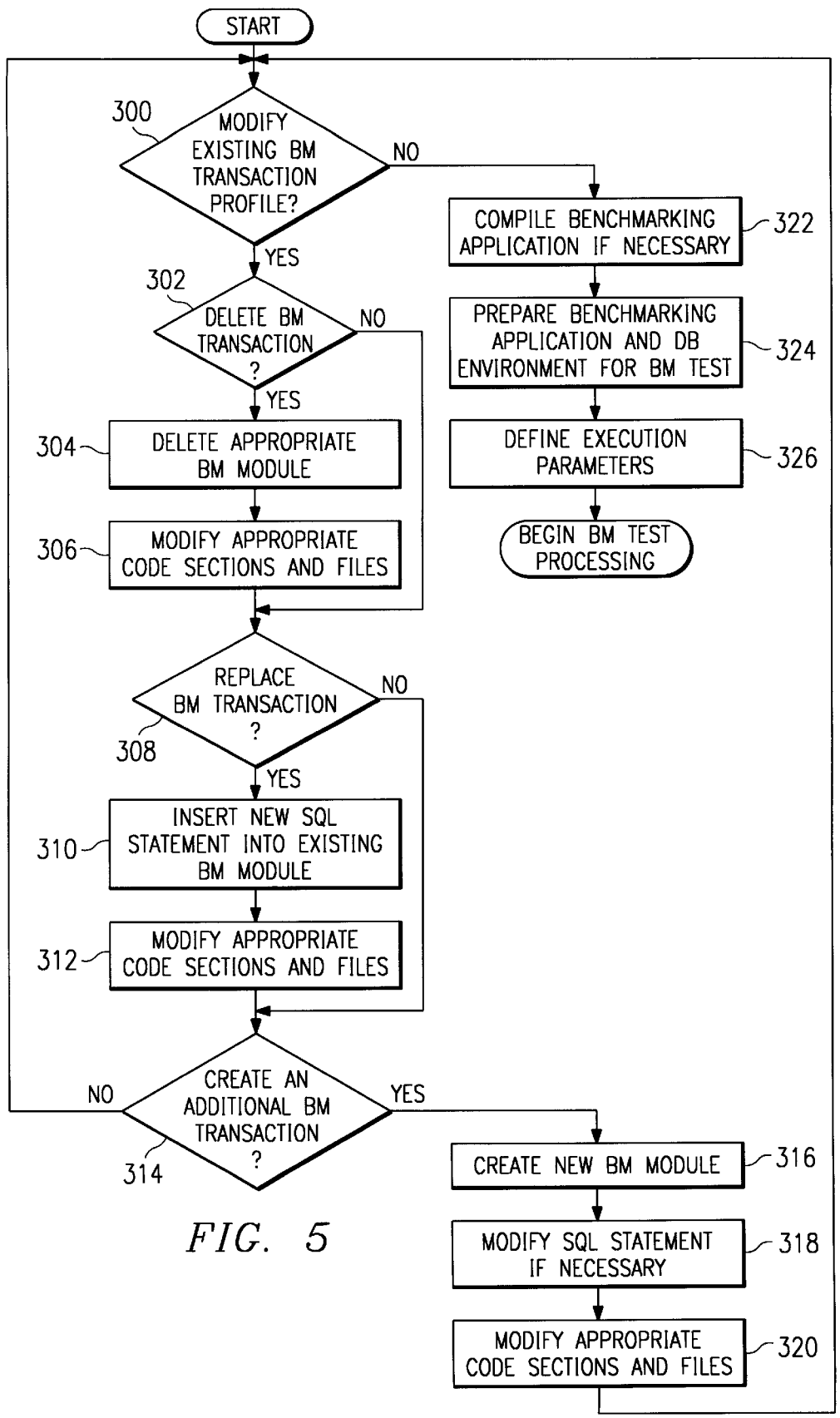
FIG. 5 is a flow chart of a method for customizing a benchmarking application.

FIG. 5 is a flow chart of a method for customizing benchmarking application 2 and other selected aspects of the benchmark test environment. In one embodiment, customizing components 80 are used in association with one or more other components of benchmarking application 2 and database environment 4 in order to customize benchmarking application to suit particular requirements.

The method begins at step 300 and determines whether to modify the existing benchmark transaction profile 110. As discussed above, benchmark transaction profile 110 refers generally to the plurality of benchmark transactions 108 generated for each user 16, 18, and 20 for submission to database server 14. If benchmark transaction profile 110 does not require modification, the method proceeds directly to step 322, where benchmarking application 2 is compiled, if necessary, in preparation for the benchmark test. If modifying benchmark transaction profile 110 is desirable at step 300 and deleting a particular benchmark transaction 108 is desirable at step 302, the particular benchmark module 106 containing the particular benchmark transaction 108 is deleted at step 304. At step 306, the appropriate code sections and files within benchmarking application 2 are modified to reflect the deletion of the particular benchmark transaction 108 from benchmark transaction profile 110.

Whether or not an existing benchmark transaction 108 is deleted at step 304, it may be desirable to modify an existing benchmark transaction 108 at step 308. As discussed above in connection with FIG. 3, each benchmark module 106 contains a particular benchmark transaction 108 in the form of an embedded SQL statement. When the embedded SQL statement is modified or replaced, a new benchmark transaction 108 is defined and benchmark transaction profile 110 is modified as a result.

In one embodiment, customizing components 80 include template functions for embedding customized SQL statements into existing or newly created benchmark modules 106. Whether or not a template function is used, the SQL statement in the benchmark module 106 corresponding to the particular benchmark transaction 108 to be modified may be replaced or otherwise modified at step 310. At step 312, the appropriate code sections and files within benchmarking application 2 are modified to reflect the replacement or modification of the particular benchmark transaction 108 and the resulting modification of benchmark transaction profile 110.

Whether of not an existing benchmark transaction 108 is replaced or modified at step 310, it may be desirable to create an additional benchmark transaction 108 at step 314. If not, the method returns to step 300. As discussed above in connection with FIG. 3, customizing components 80 may include a plurality of sample functions that may be incorporated into benchmarking application 2 and used as benchmark modules 106 without modification. In one embodiment, each of these sample functions contains an embedded SQL statement representing, for example, a query or other transaction that database server 14 may typically encounter during normal processing. However, even after a sample function has been incorporated into benchmarking application 2 as a benchmark module 106, the benchmark transaction 108 contained in the benchmark module 106 can be replaced or modified in the manner discussed above.

A new benchmark module 106 may also be created by copying or otherwise reproducing an existing benchmark module 106. In one embodiment, customizing components include one or more template functions for creating benchmark modules 106 that may not yet contain embedded SQL statements representing particular benchmark transactions 108. As discussed above, customizing components include template functions for embedding customized SQL statements into existing or newly created benchmark modules 106. Whether a new benchmark module 106 is created at step 316 using an existing benchmark module 106 or a template function provided for that purpose, an additional benchmark transaction 108 may be defined at step 318 by embedding a customized SQL statement into the new benchmark module 106, using a template function or otherwise.

The addition of a new benchmark transaction 108 will be reflected in benchmark transaction profile 110. At step 320, the appropriate code sections and files within benchmarking application 2 are modified to reflect the addition of the new benchmark transaction 108 and the resulting modification of benchmark transaction profile 110. The method then returns to step 300. Steps 300 through 320 may be repeated as many times as necessary to define a benchmark transaction profile 110 that suits the particular requirements of the benchmark test and database environment 4. The present invention contemplates other suitable methods for adding, replacing, and modifying benchmark modules 106 and benchmark transactions 108 in order to modify benchmark transaction profile 110.

At step 322, the modified benchmarking application 2 is compiled, if necessary. In one embodiment, customizing components provide, alone or in association with other components of benchmarking application 2, a mechanism for compiling benchmarking application 2 after a customized benchmark transaction profile 110 has been suitably defined. At step 324, other aspects of benchmarking application 2 and the benchmark test environment may be modified in preparation for the benchmark test. In one embodiment, benchmark users file 84 is updated to ensure that the user ID sequence for the benchmark test begins at "0001" and transaction log files 88, 90, and 92 and process log files 89, 91, and 93 are inspected and undesired log information remaining from previous benchmark tests is removed. The present invention contemplates as many other modifications to database environment 4 and benchmarking application 2 as are necessary or suitable for conducting one or more benchmark tests using benchmarking application 2.

Execution parameters 82 are specified at step 326. Benchmark test processing begins when driver program 78 is invoked to generate a separate process 56, 58, and 60 for each benchmark test user 16, 18, and 20, respectively. In one embodiment, execution parameters 82 are passed to processes 56, 58, and 60 as run-time arguments for use in generating benchmark transactions 108 for submission to database server 14.

Figure 6:
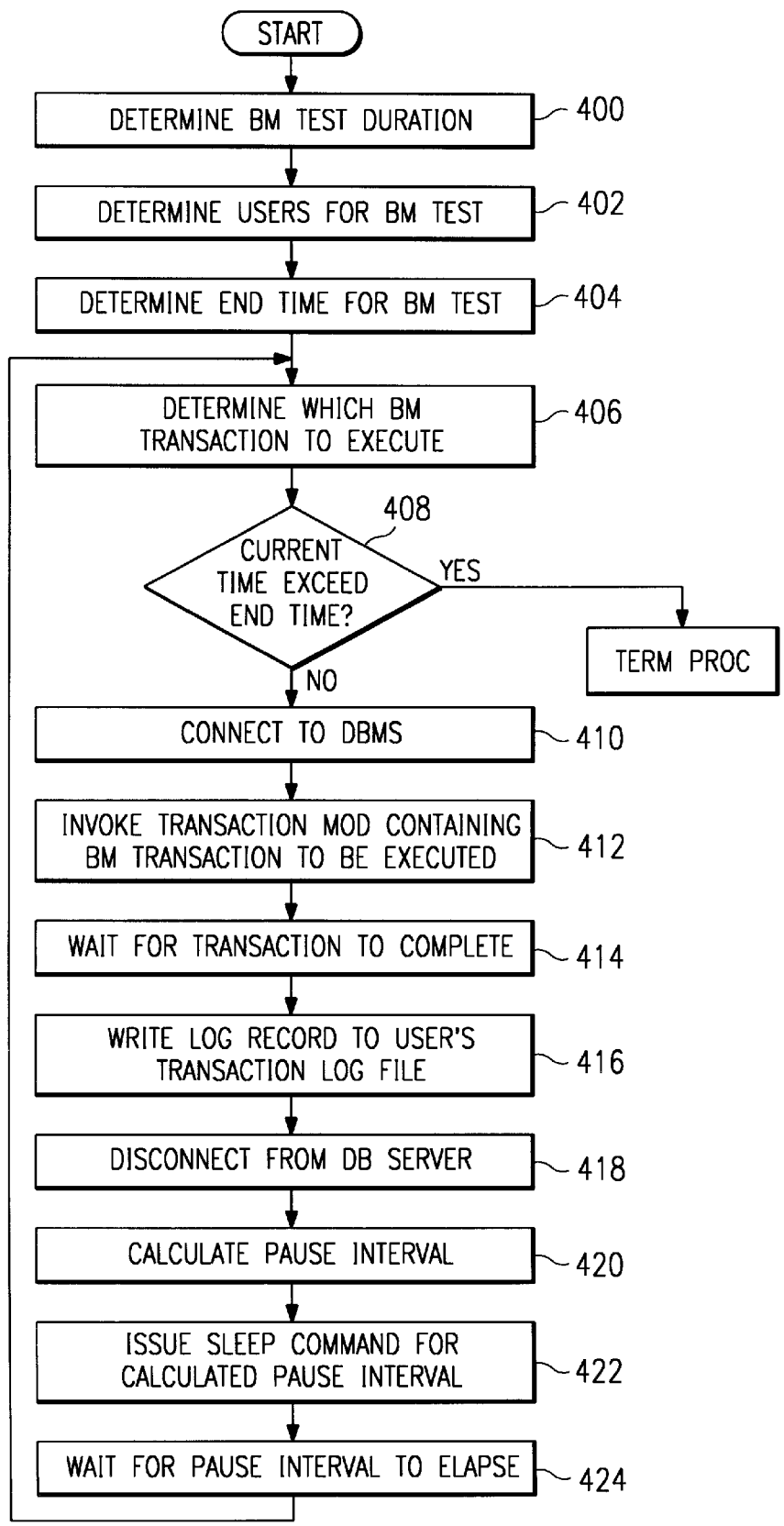
FIG. 6 is a flow chart of a method for generating benchmark transactions and submitting the benchmark transactions to a database server.

FIG. 6 is a flow chart of a method for generating benchmark transactions for submission to database server 14. As discussed above in connection with FIG. 3, each generated process 56, 58, and 60 includes main program 104 that directs the operation of the benchmark test. Although only process 56 may be discussed below, the following discussion applies equally to processes 58 and 60. The method begins at step 400, where main program 104 determines the benchmark test duration specified in execution parameters 82. In one embodiment, the benchmark test duration is measured in minutes and is the length of time benchmarking application 2 allows processes 56, 58, and 60 to operate once generated. At step 402, main program 104 opens benchmark users file 84 to determine which user account 22, 24, or 26 to use to access the resources of database 12 for the benchmark test.

Main program 104 determines the end time for the benchmark test at step 404. In one embodiment, main program 104 computes the end time by determining the current system time and then adding the benchmark test duration specified in execution parameters 82 and determined previously at step 400. Main program 104 may access a timekeeping function maintained by the operating system that supports benchmarking application 2 in order to determine the current system time or may determine the current system time in any other suitable manner.

At step 406, main program 104 determines which benchmark transaction 108 to generate for submission to database server 14 using the execution sequence specified in benchmark transactions file 86 and skip algorithm 114. As discussed above in connection with FIG. 3, the specified execution sequence and skip algorithm 114 cooperate to provide a reproducible benchmark transaction profile 110 for each user 16, 18, and 20, while allowing database server 14 to experience an essentially random transaction load.

Main program 104 determines whether the current system time exceeds the benchmark test end time at step 408. If the current system time exceeds the benchmark test end time, process 56 terminates. If the current system time does not exceed the benchmark test end time, main program 104 connects to database server 14 using connect module 112 at step 410. At step 412, main program 104 invokes the transaction module 106 containing the particular benchmark transaction 108 to be generated for submission to database server 14. Main program 104 then waits for benchmark transaction 108 to be completed at step 414.

When the particular benchmark transaction 108 has been completed, main program 104 writes a log record for benchmark transaction 108 to transaction log file 88 at step 416. In one embodiment, the log record will contain various fields that provide information concerning the generation, submission, and completion of benchmark transaction 108. As discussed above in connection with FIG. 2, the log record may include, without limitation: the number of the benchmark transaction; the RDBMS return code for the benchmark transaction; the number of rows returned by the benchmark transaction; the elapsed time for completing the benchmark transaction; and any other suitable information associated with benchmark transaction 108.

Where database 12 is a relational database and database server 14 supports an RDBMS, transaction log file 88 may combine the collective log records for every benchmark transaction 108 submitted to database server 14 by process 56 in order to provide a more complete description of the processing performed by benchmarking application 2 and database server 14. Main program 104 disconnects from database server 14 using connect module 112 at step 418. Main program may disconnect from database server 14 before or after writing a log record to transaction log file 88.

At step 420, main program 104 calculates the pause interval that will be used in issuing a sleep command for process 56. After the sleep command is issued at step 422, process 56 will sleep for the calculated pause interval at step 424 before determining whether to generate an additional benchmark transaction 108. In one embodiment, the pause interval is calculated using the pause factor (PF) specified in execution parameters 82 and the ID number (ID) given to the particular user 16, 18, or 20 in the user ID sequence specified in benchmark users file 84.

For a three-user test, the ID number of user 16 is "b 0001," the ID number of user 18 is "0002," and the ID number of user 20 is "0003." The pause interval is calculated using the following formula: (PF)[(ID)+1]. Using a pause factor of ten seconds, the pause interval will be twenty seconds for process 56, thirty seconds for process 58, and forty seconds for process 60. In one embodiment, the default pause factor is thirty seconds. By defining a different pause interval for each process 56, 58, and 60, benchmarking application 2 varies the transaction load experienced by database server 14 even further, while maintaining a reproducible benchmark transaction profile 110 for each user 16, 18, and 20.

When the pause interval has elapsed at step 424, main program 104 again determines which benchmark transaction 108 to generate for submission to database server 14 at step 406. Main program 104 will continue to perform steps 406 through 424 until the current system time exceeds the benchmark end time at step 408. When all processes 56, 58, and 60 have terminated, analysis reports may be generated using the log information stored in transaction log files 88, 90, and 92 and process log files 89, 91, and 93.

Figure 7:
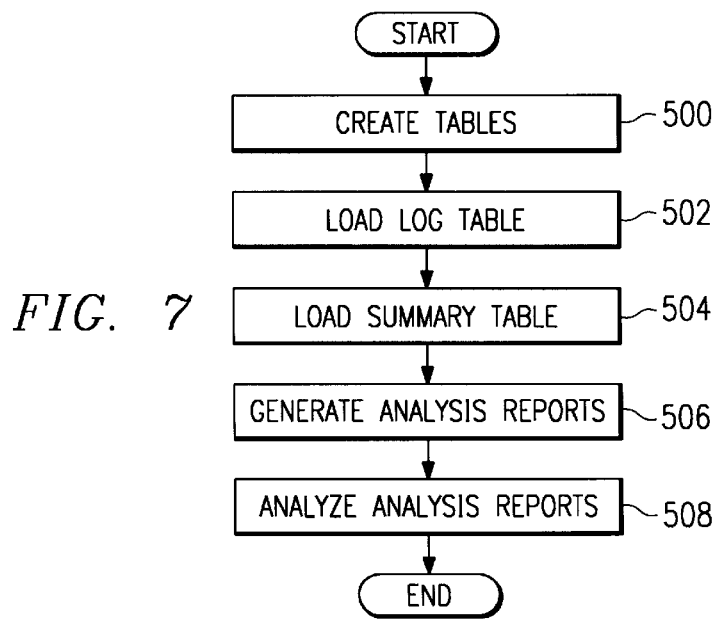
FIG. 7 is a flow chart of a method for generating analysis reports.

FIG. 7 is a flow chart of a method for generating analysis reports using the log information stored in transaction log files 88, 90, and 92 and process log files 89, 91, and 93. In one embodiment, report generation capability 94 generates analysis reports using the log information stored in transaction log files 88, 90, and 92. As discussed above in connection with FIGS. 2, 3, and 6, the log information stored in transaction log files 88, 90, and 92 provides a detailed record for each benchmark transaction 108 submitted to database server 14 for each user 16, 18, and 20, respectively.

The method begins at step 500, where one or more tables are created in the DBMS associated with benchmarking application 2 and supported by database server 14. In one embodiment, the DBMS is a relational DBMS (RDBMS) and each table is a data structure characterized by rows and columns, operable to store data at each cell formed by the intersection of a row with a column. In one embodiment, benchmarking application 2 builds a transactions table and a summary table for each user 16, 18, and 20 in a default tablespace associated with each user 16, 18, and 20 by the RDBMS. The present invention contemplates creating the transaction and summary tables in any suitable format and using any suitable method.

At step 502, the transaction log records stored in transaction log files 88, 90, and 92 are loaded into the transaction table. In one embodiment, benchmarking application 2 first merges transaction log files 88, 90, and 92, consolidating the transaction log records contained in transaction log files 88, 90, and 92, and then loads the combined transaction log records into the transactions table. As a result, the transactions table may contain one row for each transaction log record.

The summary table is loaded at step 504. Benchmarking application 2 may load the summary table after loading the transactions table. This is performed by extracting all of the transaction log records from the transactions table for the particular benchmark test. Benchmarking application 2 then summarizes, for successive intervals, the transaction log records for each benchmark transaction 108. For example, using a five minute interval, the summary table might contain the total number of times each benchmark transaction 108 was generated and submitted to database server 14 during each successive five minute period of the benchmark test.

The information contained in the summary table may be correlated with other measurements of database server 14 and the remainder of database environment 4 gathered for successive time intervals, whether or not benchmarking application 2 is used to gather these other measurements. The present invention contemplates any suitable mechanism for summarizing the performance of database server 14 using the log information contained in transaction log files 88, 90, and 92 and process log files 89, 91, and 93.

Analysis reports are generated at step 506 using report generation capability 94. Benchmarking application 2 may generate, without limitation, the following analysis reports for each benchmark test: (1) Transaction by User—for each user, this report provides a detailed listing of start, stop, and elapsed times for each submission of each benchmark transaction 108; (2) Transaction Summary by User—for each user, this report summarizes the performance of database server 14 by reporting the submission count and average, minimum, and maximum elapsed times for each benchmark transaction 108; (3) Average Response by Transaction—for each benchmark transaction 108, this report summarizes the total submission count and elapsed time for each submission; (4) Transactions in Chronological Order—this report provides a detailed listing of all submissions of all benchmark transactions 108, ordered according to start time; and (5) Benchmark Interval Summary—for each specified time interval, this report provides a summary extracted from the summary table for each benchmark transaction 108, including total submission count, average elapsed time, and the number of rows returned.

The present invention contemplates generating other analysis reports suitable for measuring the performance of database server 14. For example, three-dimensional graphs may be generated using extracts from the summary table to provide a more visually-oriented analysis tool. Once generated, the analysis reports are analyzed at step 508. As a result of this analysis, the performance of database server 14 for the benchmark test may be quantitatively and qualitatively assessed.

Although the present invention has been described with several embodiments, a plethora of changes, substitutions, variations, alterations, transformations and modifications may be suggested to one skilled in the art, and it is intended that the present invention encompass such changes, substitutions, variations, alterations, transformations, and modifications as fall within the spirit and scope of the appended claims.

What is claimed is:

1. A benchmarking application for testing the performance of a database server, comprising:

a plurality of execution parameters;

a program operable to read the execution parameters; and a plurality of processes generated by the program according to the execution parameters, each process generated to represent a particular user of the database server and operable to generate benchmark transactions for communication to the database server as a repeatable sequence of queries, the benchmark transactions being communicated to the database server in a selected reproducible transaction sequence for each user, the communicated benchmark transactions for all users collectively testing the performance of database-specific activity by the database server.

2. The application of claim 1, wherein the execution parameters specify a predetermined number of users of the database server.

3. The application of claim 1, wherein the application is operable to communicate benchmark transactions to the database server in the same reproducible transaction sequence for a particular user each time the performance of the database server is tested.

4. The application of claim 3, wherein the reproducible transaction sequence is specified using a skip algorithm, the skip algorithm at least partially specifying a different reproducible transaction sequence for each user.

5. The application of claim 1, further comprising a plurality of transaction modules associated with each process, each transaction module having an embedded benchmark transaction.

6. The application of claim 1, further comprising a programmatic interface, wherein the benchmark transactions generated by each process may be customized using the programmatic interface.

7. The application of claim 1, further comprising a plurality of connect modules, each process having an associated connect module operable to communicate benchmark transactions from the process to the database server.

8. The application of claim 1, further comprising a plurality of transaction log files, each process having an associated transaction log file operable to store log information concerning the benchmark transactions generated by the process.

9. The application of claim 8, wherein the application is operable to generate analysis reports using the log information stored in the transaction log files.

10. The application of claim 1, further comprising a plurality of template functions for customizing the benchmark transactions communicated to the database server.

11. The application of claim 1, wherein performance of the database server is tested without testing the performance of networks, user interfaces, and user workstations associated with the database server.

12. A system for benchmarking a database server, comprising:
a database;
a database server coupled to the database and operable to serve a plurality of users; and
a plurality of processes, each process representing one of the users of the database server and operable to generate benchmark transactions for communication to the database server as a repeatable sequence of database queries, the benchmark transactions for all users being communicated to the database server according to a specified execution sequence, the benchmark transactions being communicated in a selected pattern and at selected intervals for each user to define a reproducible transaction sequence for each user, the communicated benchmark transactions for all users collectively testing the performance of database-specific activity by the database server.

13. The system of claim 12, wherein the processes run on a first computer and the database server runs on a second computer.

14. The system of claim 12, further comprising a program and a plurality of execution parameters, the program operable to read the execution parameters and to generate the processes in accordance with the execution parameters, wherein the execution parameters specify a predetermined number of users of the database server and specify the particular access of each user to the database server.

15. The system of claim 12, wherein the system is operable to communicate benchmark transactions to the database server in the same reproducible transaction sequence for a particular user each time the database server is tested.

16. The application of claim 15, wherein the reproducible transaction sequence is specified using a skip algorithm, the skip algorithm at least partially specifying a different reproducible transaction sequence for each user.

17. The application of claim 12, further comprising a plurality of transaction log files, each process having an associated transaction log file operable to store log information concerning the benchmark transactions generated by the process.

18. The system of claim 12, further comprising a plurality of template functions for customizing the benchmark transactions communicated to the database server.

19. The system of claim 12, wherein performance of the database server is tested without testing the performance of networks, user interfaces, and user workstations associated with the database server.

20. A method for benchmarking a database server, comprising:
generating a plurality of processes, each of the processes representing a user of the database server;
generating, at the processes, benchmark transactions for the corresponding user, the benchmark transactions being database queries operable to prompt the database server to perform some database-specific activity; and
communicating the benchmark transactions for each user to the database server as a repeatable sequence of database queries, the benchmark transactions being communicated to the database server in a selected reproducible transaction sequence for each user, the communicated benchmark transactions for all users collectively testing the performance of some database-specific activity by the database server.

21. The method of claim 20, further comprising defining a plurality of execution parameters specifying a predetermined number of users of the database server.

22. The method of claim 20, further comprising customizing the benchmark transactions generated by each process using a programmatic interface.

23. The method of claim 20, wherein communicating benchmark transactions to the database server comprises communicating benchmark transactions to the database server in the same reproducible transaction sequence for a particular user each time the database server is benchmarked.

24. The method of claim 20, wherein the step of generating benchmark transactions comprises generating benchmark transactions in a different reproducible transaction sequence for each user, the database queries being communicated to the database server in a different pattern and at different intervals for each user.

25. The method of claim 20, further comprising the step of customizing the benchmark transactions communicated to the database server using template functions.

26. The method of claim 20, wherein performance of the database server is tested without testing the performance of networks, user interfaces, and user workstations associated with the database server.

* * * * *